(12) United States Patent  
Liang et al.

(10) Patent No.: US 8,437,153 B2  
(45) Date of Patent: May 7, 2013

(54) SERIES RESONANT CONVERTER CAPABLE OF REDUCING PEAK VOLTAGE GENERATED AT POWER SWITCHES AND PEAK CURRENT GENERATED ON SECONDARY SIDE WHEN BEING TURNED ON FROM OFF IMMEDIATELY

(75) Inventors: Jim-Hung Liang, Taipei (TW); Ching-Chuan Chen, Taipei (TW)

(73) Assignee: Skynet Electronic Co., Ltd., Taipei (TW)

( * ) Notice: Subject to any disclaimer, the term of this patent is extended or adjusted under 35 U.S.C. 154(b) by 99 days.

(21) Appl. No.: 12/923,875

(22) Filed: Oct. 13, 2010

(65) Prior Publication Data

US 2012/0044721 A1    Feb. 23, 2012

(30) Foreign Application Priority Data

Aug. 23, 2010  (TW) ................................ 99128063 A

(51) Int. Cl.  
*H02M 3/335*   (2006.01)

(52) U.S. Cl.  
USPC ...................................................... 363/21.02

(58) Field of Classification Search ............... 363/21.02, 363/21.03, 21.04–21.06, 21.11–21.12  
See application file for complete search history.

(56) References Cited

U.S. PATENT DOCUMENTS

| | | | |
|---|---|---|---|
| 2007/0008757 A1* | 1/2007 | Usui et al. ..................... | 363/125 |
| 2007/0165426 A1* | 7/2007 | Kyono ......................... | 363/21.02 |
| 2007/0285952 A1* | 12/2007 | Zeng et al. ................. | 363/21.02 |
| 2009/0016083 A1* | 1/2009 | Soldano et al. ................. | 363/20 |

* cited by examiner

*Primary Examiner* — Adolf Berhane  
*Assistant Examiner* — Jeffrey Gblende  
(74) *Attorney, Agent, or Firm* — Bacon & Thomas, PLLC

(57) ABSTRACT

The present invention is to provide a series resonant converter, which includes a transformer, two power switches connected to primary side of the transformer, a resonant control chip having two control pins connected to gates of the two power switches respectively, a resonant capacitor having one end connected to one end of the primary side and the other end connected to source of one power switch, a resonant inductor having one end connected to the other end of the primary side and the other end connected to a line between the two power switches, and at least one bypass resistor connected in parallel to the resonant capacitor, so as to allow voltage of the resonant capacitor to be rapidly released to ground when the converter is turned off and effectively lower inrush current of the resonant capacitor generated at an instant when the converter is turned on from off.

2 Claims, 6 Drawing Sheets

SERIES RESONANT CONVERTER CAPABLE OF REDUCING PEAK VOLTAGE GENERATED AT POWER SWITCHES AND PEAK CURRENT GENERATED ON SECONDARY SIDE WHEN BEING TURNED ON FROM OFF IMMEDIATELY

FIELD OF THE INVENTION

The present invention relates to a series resonant converter, more particularly to a series resonant converter using power switches with relatively low rated voltages and currents, which includes at least one bypass resistor connected in parallel to a resonant capacitor thereof and then connected to a ground end, so as to allow high voltage accumulated at the resonant capacitor to be rapidly released to the ground end and become zero at once when the series resonant converter is turned off. In consequence, inrush current of the resonant capacitor generated at an instant when the series resonant converter is turned on from off is lowered, and peak voltage generated at power switch of the series resonant converter and peak currents generated on primary and secondary sides of the series resonant converter are effectively reduced.

BACKGROUND OF THE INVENTION

Recently, as the operating frequency and efficiency of computers, peripheral devices, and many other electronic apparatuses have been continuously increased, designers of DC-to-DC converters have made great effort in reducing the power loss of such converters as much as possible, in order to provide the aforesaid electronic apparatuses with a DC input voltage that features high efficiency, high reliability, and a highly flexible range. Therefore, resonant converters based on the soft switching technique have emerged which operate on the following principle. First of all, a resonant inductor, a resonant capacitor, and like elements are provided on the primary side of a transformer via series connection, parallel connection, or series-parallel connection. Then, by means of a resonant control chip and the principle of resonance, zero-voltage or zero-current switching of the power elements in the resonant converter is achieved to effectively reduce the switching loss of the power elements, thereby increasing the overall conversion efficiency. Nowadays, with the advancement of the manufacturing technology of resonant control chips and power elements, plus the gradually declining prices of such components, resonant converters with high efficiency, high operating frequency, and a simple structure have become more and more popular in the industry and are extensively used in a variety of electronic appliances. In particular, series resonant converters are preferred industry-wide for their high efficiency and wide output voltage range at high input voltage.

Referring to FIG. 1, a series resonant converter commonly used in the industry typically includes an input voltage filter capacitor $C_{in}$; a resonant control chip IC; a first power switch $Q_1$; a second power switch $Q_2$; a resonant inductor $L_r$; a resonant capacitor $C_r$; a transformer $T_1$; two secondary rectifier diodes $D_1$, $D_2$; and an output voltage filter capacitor $C_{out}$. The input voltage filter capacitor $C_{in}$ is connected across the positive and negative ends of a DC input voltage V. The first power switch $Q_1$ and the second power switches $Q_2$ are connected in series to each other and are connected in parallel to the input voltage filter capacitor $C_{in}$. The gates of the first and second power switches $Q_1$, $Q_2$ are connected to the corresponding control pins of the resonant control chip IC respectively. For example, if the resonant control chip IC is the high-voltage resonant controller ST L6599A made by the famous chip manufacturer STMicroelectronics, the gates of the first and second power switches $Q_1$, $Q_2$ will be connected to the control pins HVG, LVG of the resonant control chip IC respectively. The drain and the source of the first power switch $Q_1$ are connected to the anode of the input voltage filter capacitor $C_{in}$, and the drain of the second power switch $Q_2$ respectively. The source of the second power switch $Q_2$ is connected to the cathode of the input voltage filter capacitor $C_{in}$. Thus, the input voltage filter capacitor $C_1$ is capable of providing a stable input voltage to the transformer $T_1$. The transformer $T_1$ is configured mainly for isolation and includes a primary winding $N_P$ and two secondary windings $N_{S1}$, $N_{S2}$. The primary winding $N_P$ has one end connected to the anode of the resonant capacitor $C_r$ and the other end connected via the resonant inductor $L_r$ to a line between the two power switches $Q_1$, $Q_2$. Meanwhile, the cathode of the resonant capacitor $C_r$ is connected to the source of the second power switch $Q_2$. The secondary winding $N_{S1}$ has one end connected to the anode of the output voltage filter capacitor $C_{out}$ and the other end connected to the negative end of the secondary rectifier diode $D_1$. Similarly, the secondary winding $N_{S2}$ has one end connected to the anode of the output voltage filter capacitor $C_{out}$ and the other end connected to the negative end of the secondary rectifier diode $D_2$. The positive ends of the secondary rectifier diodes $D_1$, $D_2$ are connected to the cathode of the output voltage filter capacitor $C_{out}$. Thus, the output voltage filter capacitor $C_{out}$ is capable of providing a stable DC output voltage $V_{out}$ to a load connected across the output ends. The working principle of such a conventional series resonant converter is briefly stated as follows. By virtue of the impedance properties of the resonant inductor $L_r$ and the resonant capacitor $C_r$ series-connected on the primary side, the resonant control chip IC controls the switching frequencies of the two power switches $Q_1$, $Q_2$ and thereby enables the series resonant converter to provide a stable output voltage according to the load connected across the output ends.

FIG. 2 shows the results of using a probe with an internal resistance of 100 MΩ to measure the voltage of the resonant capacitor $C_r$ when the conventional series resonant converter described above is turned off. In practice, due to the load effect of the probe during measurement, the high voltage $V_{cr}$ accumulated at the resonant capacitor $C_r$ is discharged only gradually but is not reduced to zero instantly. More specifically, it takes at least about 7 seconds (i.e., the period indicated by >7 S in FIG. 2) for the voltage $V_{cr}$ of the resonant capacitor $C_r$ to go to zero. On the other hand, the horizontal dashed line in FIG. 2 represents the voltage waveform of the resonant capacitor $C_r$ in the absence of the load effect of the probe. As the high voltage $V_{cr}$ accumulated at the resonant capacitor $C_r$ finds no discharge path under such a condition, the voltage of the resonant capacitor $C_r$ stays above 0.5 Vbus at power-off. If Vbus=400V, the voltage of the resonant capacitor $C_r$ will be 200V or above. Therefore, immediately when the series resonant converter is turned on from off, as shown in FIG. 3, the high voltage stored in the resonant capacitor $C_r$ generates such a high inrush current that, upon switching the second power switch $Q_2$, the voltage $V_{ds}$ across the drain and the source of the second power switch $Q_2$ reaches a peak voltage $V_{pk}$ of 540V (as indicated by the upper left arrow in FIG. 3). Meantime, a peak current $I_{ppk}$ as high as 20 A is generated on the primary side (as indicated by the arrow corresponding to the primary-side current $I_p$ in FIG. 3), and a peak current $I_{spk}$ as high as 280 A is generated on the secondary side (as indicated by the arrow corresponding to the secondary-side current $I_s$ in FIG. 3). As a result, both the primary side and the secondary side require power switches of high rated voltages and high rated currents. Therefore, the issue to be addressed by the present invention is to design and make a series resonant converter which not only has a simple circuit composed of low-cost electronic components, but also can zero the voltage of the resonant capacitor $C_r$ instantaneously at power-off so that, when the series resonant converter is turned on from off, the inrush current of the resonant capacitor $C_r$ will be low, thereby effectively reducing the peak voltage $V_{pk}$ generated at the second power switch $Q_2$, the peak current $I_{ppk}$ on the primary side, and the peak current $I_{spk}$ on the secondary side.

BRIEF SUMMARY OF THE INVENTION

In view of the aforementioned shortcomings of the conventional series resonant converter, the inventor of the present invention put years of practical experience into research and experiment and finally succeeded in developing a series resonant converter which uses power switches with relatively low rated voltages and relatively low rated currents.

The primary object of the present invention is to provide a series resonant converter including a transformer, a first power switch, a second power switch, a resonant control chip, a resonant capacitor, a resonant inductor, and at least one bypass resistor. On the primary side of the transformer is a primary winding for receiving a DC input voltage, and on the secondary side of the transformer are two secondary windings for providing a DC output voltage. The power switches are connected to the primary side, with the first power switch and the second power switch in series connection. The resonant control chip has two control pins connected to the gate of the first power switch and the gate of the second power switch respectively. The resonant capacitor has one end connected to one end of the primary winding and the other end connected to the source of the second power switch. The resonant inductor has one end connected to the other end of the primary winding and the other end connected to a line between the first power switch and the second power switch. The at least one bypass resistor is connected in parallel to the resonant capacitor and is connected to a ground end, thus allowing the high voltage accumulated at the resonant capacitor to be rapidly released to the ground end at power-off. Hence, when the series resonant converter is turned off, the at least one bypass resistor zeros the voltage of the resonant capacitor at once, and in consequence the inrush current of the resonant capacitor that is generated at the instant when the series resonant converter is turned on from off is low. As a result, the peak voltage generated at the second power switch and the peak currents generated on the primary side and the secondary side are effectively reduced, allowing the series resonant converter to use power switches with relatively low rated voltages and relatively low rated currents, which in turn reduces the cost of the series resonant converter.

BRIEF DESCRIPTION OF THE SEVERAL VIEWS OF THE DRAWINGS

The structure and the technical means adopted by the present invention to achieve the above and other objects can be best understood by referring to the following detailed description of a preferred embodiment in conjunction with the accompanying drawings, in which:

FIG. 2 shows the voltage $V_{cr}$ of the resonant capacitor $C_r$ at power-off;

FIG. 3 shows the voltage $V_{ds}$ across the drain and the source of the second power switch $Q_2$, the primary-side current, and the secondary-side current at the instant when the series resonant converter is turned on from off;

FIG. 5 shows the voltage $V_{cr}$ of the resonant capacitor $C_r$ at power-off; FIG. 6 shows the voltage $V_{ds}$ across the drain and the source of the second power switch $Q_2$, the primary-side current, and the secondary-side current at the instant when the series resonant converter is turned on from off.

DETAILED DESCRIPTION OF THE INVENTION

Figure 4:
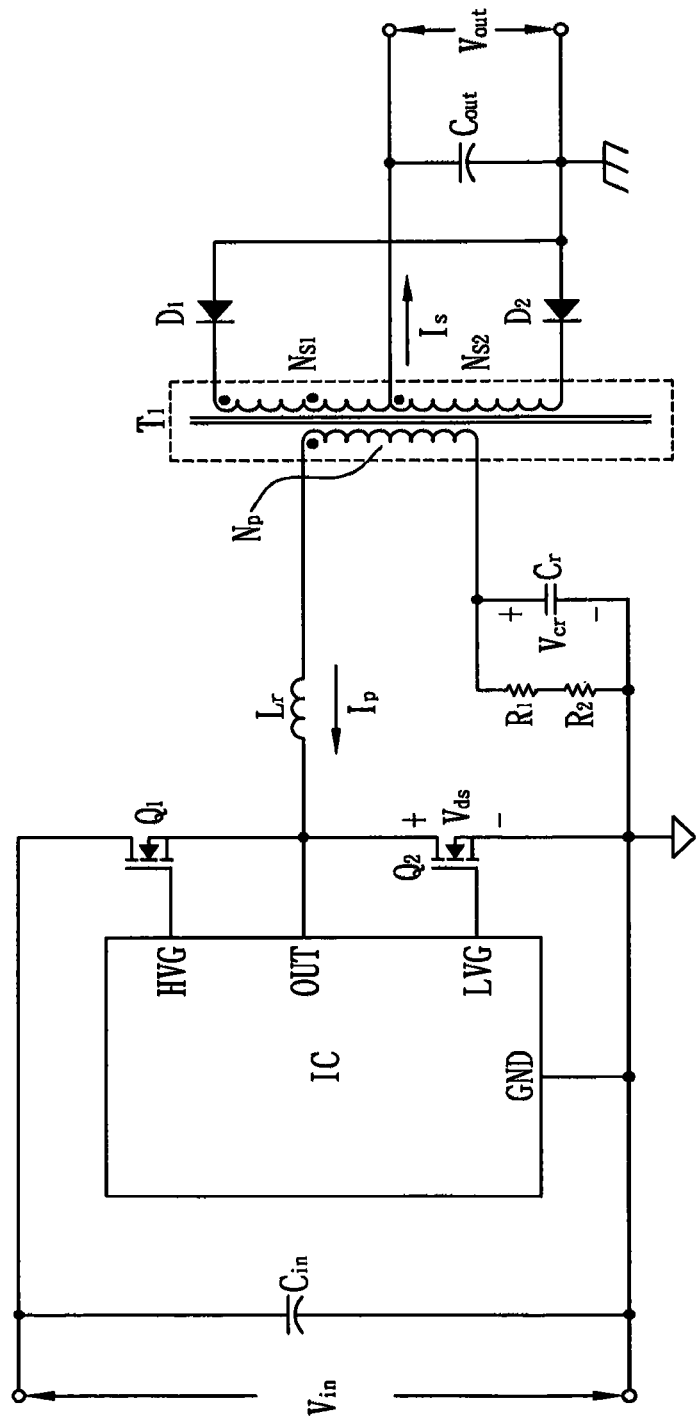
FIG. 4 is a circuit diagram of a series resonant converter according to a preferred embodiment of the present invention.

The present invention provides a series resonant converter using power switches with relatively low rated voltages and relatively low rated currents. Referring to FIG. 4, a series resonant converter according to a preferred embodiment of the present invention includes an input voltage filter capacitor $C_{in}$; a resonant control chip IC; two primary-side power switches (namely a first power switch $Q_1$ and a second power switch $Q_2$); a resonant inductor $L_r$; a resonant capacitor $C_r$; a transformer $T_1$; two secondary rectifier diodes $D_1$, $D_2$; an output voltage filter capacitor $C_{out}$; and at least one bypass resistor $R_1$, $R_2$. The input voltage filter capacitor $C_{in}$ is connected across the positive and negative ends of a DC input voltage V. The first power switch $Q_1$ and the second power switch $Q_2$ are connected in series to each other and are parallel-connected to the input voltage filter capacitor $C_{in}$. The gate of the first power switch $Q_1$ and the gate of the second power switch $Q_2$ are connected to the corresponding control pins HVG, LUG of the resonant control chip IC respectively. (The resonant control chip IC is exemplified herein by the high-voltage resonant controller ST L6599A of STMicroelectronics.) The drain of the first power switch $Q_1$ is connected to the anode of the input voltage filter capacitor $C_{in}$ while the source of the first power switch $Q_1$ is connected to the drain of the second power switch $Q_2$. On the other hand, the source of the second power switch $Q_2$ is connected to the cathode of the input voltage filter capacitor $C_{in}$. Thus, the input voltage filter capacitor $C_{in}$ can provide a stable input voltage to the transformer $T_1$. The transformer $T_1$ is intended mainly for isolation and includes a primary winding $N_P$ and two secondary windings $N_{S1}$, $N_{S2}$. The primary winding $N_P$ has one end connected to the anode of the resonant capacitor $C_r$ and the other end connected via the resonant inductor $L_r$ to a line between the two power switches $Q_1$, $Q_2$. The cathode of the resonant capacitor $C_r$ is connected to the source of the second power switch $Q_2$. The bypass resistors $R_1$, $R_2$ are connected in parallel to the resonant capacitor $C_r$ and are connected to a ground end so that the high voltage accumulated at the resonant capacitor $C_r$ can be rapidly released to the ground end at power-off. In this embodiment as shown in FIG. 4, the secondary winding $N_{S1}$ has one end connected to the anode of the output voltage filter capacitor $C_{out}$ and the other end connected to the negative end of the secondary rectifier diode $D_1$. Similarly, the secondary winding $N_{S2}$ has one end connected to the anode of the output voltage filter capacitor $C_{out}$ and the other end connected to the negative end of the secondary rectifier diode $D_2$. Meantime, the positive ends of the secondary rectifier diodes $D_1$, $D_2$ are connected to the cathode of the output voltage filter capacitor $C_{out}$. Thus, the output voltage filter capacitor $C_{out}$ can provide a stable DC output voltage $V_{out}$ to a load connected across the output ends. It should be pointed out that the secondary rectifier diodes $D_1$, $D_2$ in the present embodiment may be implemented by other synchronous rectifiers that are equivalent to rectifier diodes.

When the series resonant converter is turned off, the bypass resistors $R_1$, $R_2$ release the voltage of the resonant capacitor $C_r$ to the ground end at such speed that the voltage of the resonant capacitor $C_r$ is zeroed immediately. Therefore, the inrush current of the resonant capacitor $C_r$ that occurs at the instant when the series resonant converter is turned on from off is low. Because of that, the peak value of the voltage $V_{ds}$ across the drain and the source of the second power switch $Q_2$ is effectively lowered when the second power switch $Q_2$ is switched, and so are the peak currents generated on the primary side and the secondary side. The reduced peak voltage and reduced peak currents allow the series resonant converter to use power switches with relatively low rated voltages and relatively low rated currents.

The series resonant converter described above is only one preferred embodiment of the present invention; hence, implementation of the present invention is by no means limited thereto. For instance, the primary-side or secondary-side circuit design of the foregoing series resonant converter may be modified according to practical needs. In addition, each of the secondary rectifier diodes $D_1$, $D_2$ may be replaced by an equivalent semiconductor switch (e.g., a power metal-oxide-semiconductor field-effect transistor, generally abbreviated as power MOSFET) or an equivalent transistor. However, no matter how the primary-side or secondary-side circuit design of the series resonant converter is modified, the circuit structure of the present invention that seeks patent protection is directed to the circuit structure of a series resonant converter. All modifications which are readily conceivable by a person skilled in the design of series resonant converters and are based on the design principles disclosed herein should fall within the scope of the present invention, provided that there is at least one bypass resistor parallel-connected to the resonant capacitor of the series resonant converter and further connected to a ground end so as for the high voltage accumulated at the resonant capacitor to be rapidly released to the ground end at power-off.

Figure 1:
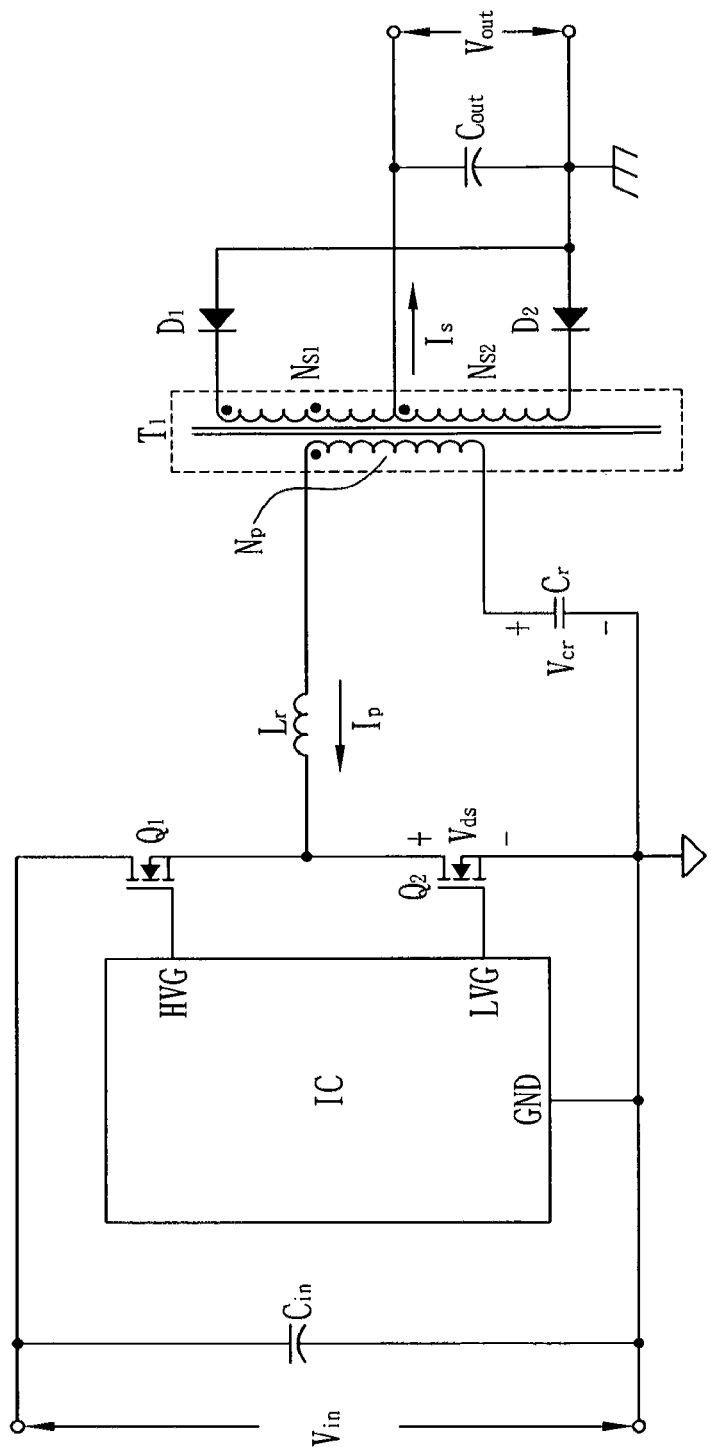
FIG. 1 is a circuit diagram of a conventional series resonant converter.
Figure 2:
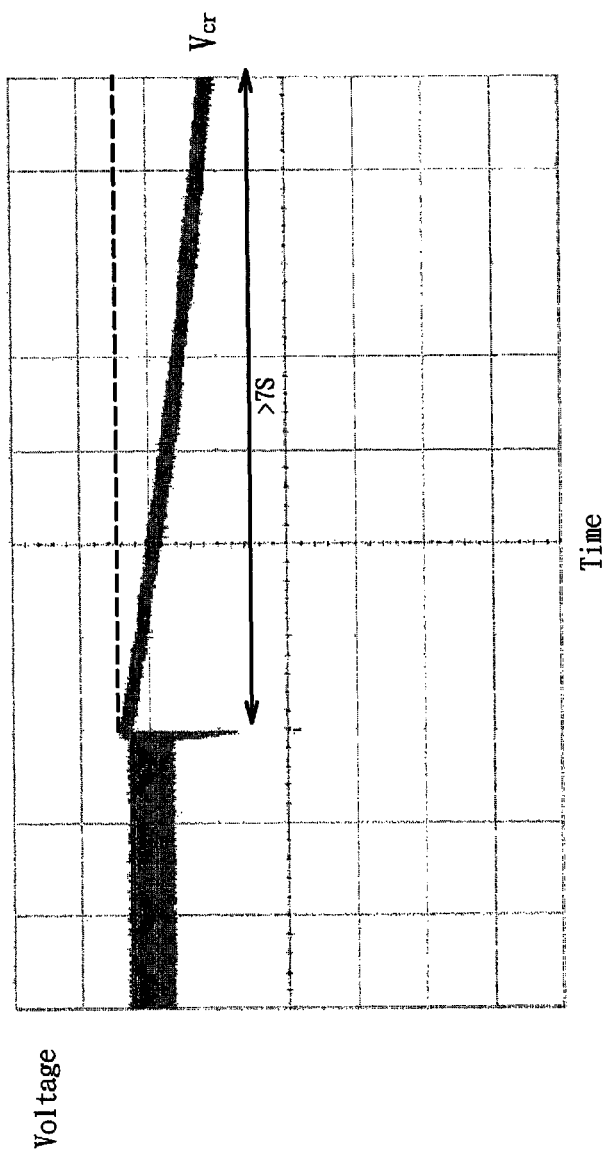
FIG. 2 is a waveform diagram showing test results of the conventional series resonant converter depicted in FIG. 1; more particularly.
Figure 3:
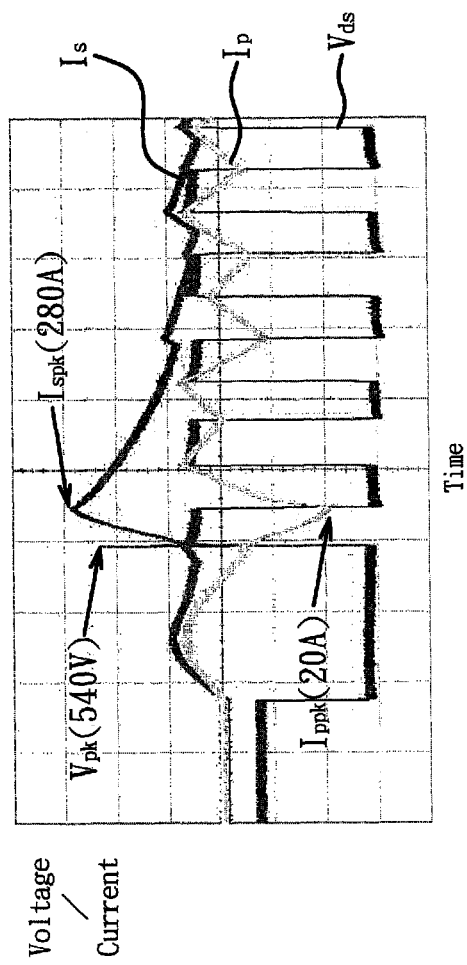
FIG. 3 is another waveform diagram showing test results of the conventional series resonant converter depicted in FIG. 1; more particularly.
Figure 5:
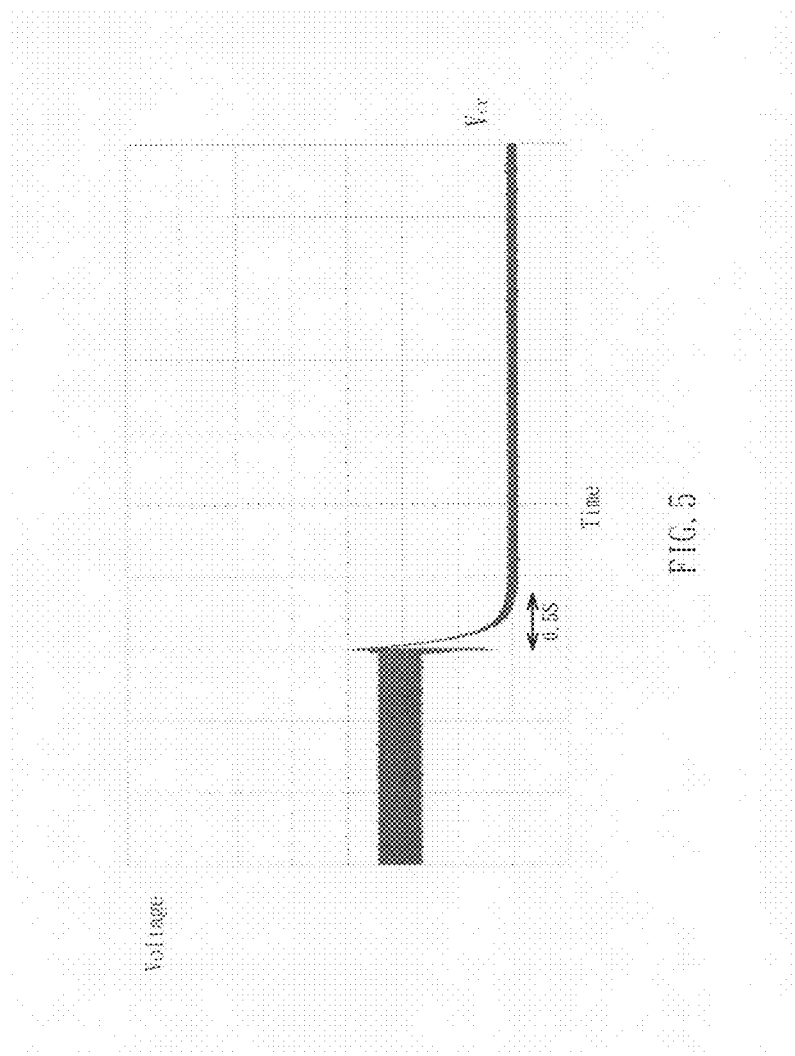
FIG. 5 is a waveform diagram showing test results of the series resonant converter depicted in FIG. 4; more particularly.
Figure 6:
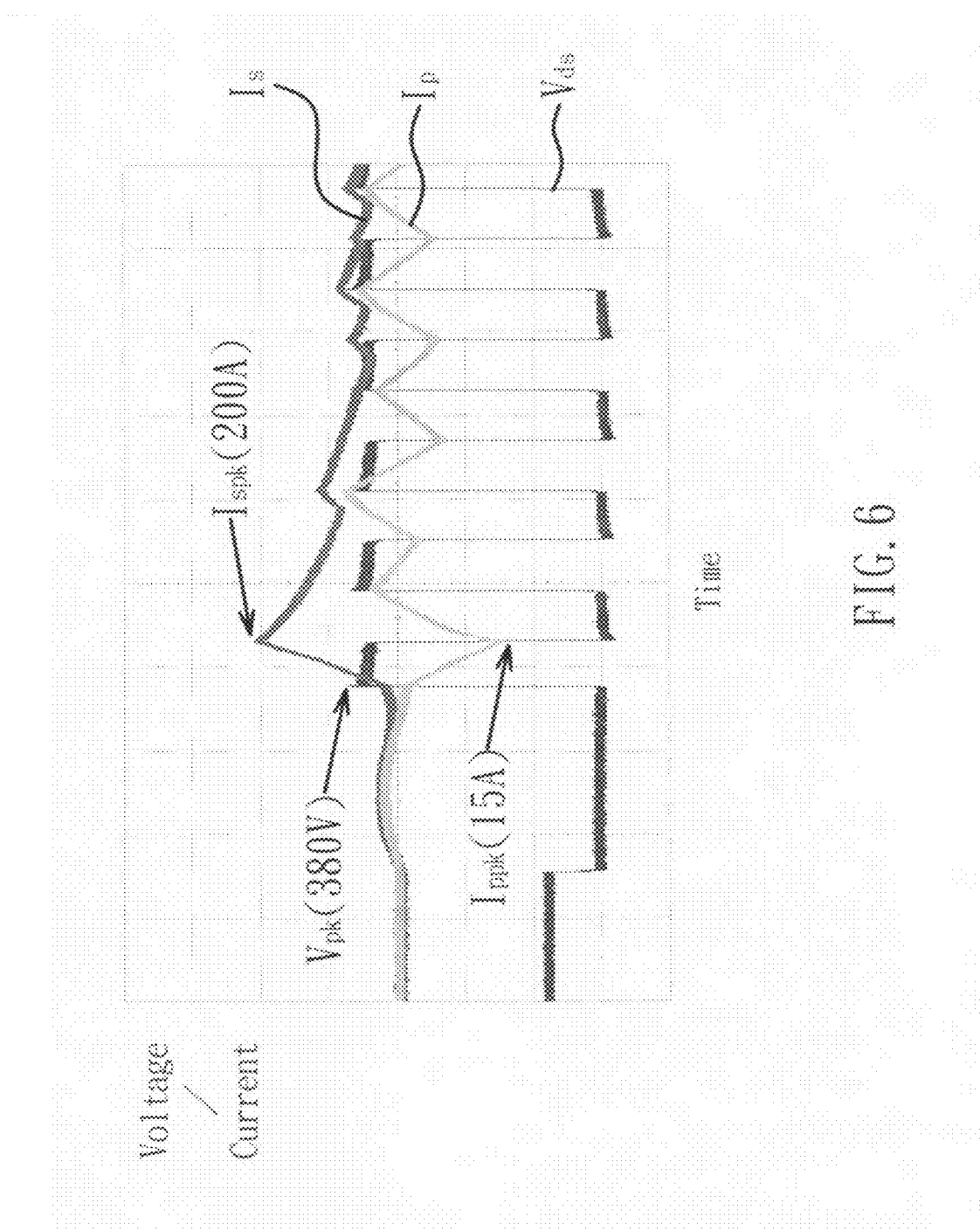
FIG. 6 is another waveform diagram showing test results of the series resonant converter depicted in FIG. 4; more particularly.

In order to verify the effect of the aforesaid bypass resistors at the instant when the series resonant converter is turned off and on, the inventor of the present invention actually designed, made, and tested an electronic circuit which is based on the circuit structure shown in FIG. 4 and provided with the bypass resistors $R_1$, $R_2$. Referring to the test results shown in FIG. 5, when the series resonant converter is turned off, the high voltage $V_{cr}$ accumulated at the resonant capacitor $C_r$ is rapidly released to the ground end via the bypass resistors $R_1$, $R_2$ and is therefore zeroed in only 0.5 second (i.e., the period indicated by 0.5 S in FIG. 5). Refer now to FIG. 6 for the test results obtained at the instant when the series resonant converter is turned on from off. When the second power switch $Q_2$ is switched at power-on, the peak value $V_{pk}$ of the voltage $V_{ds}$ across the drain and the source of the second power switch $Q_2$ is lowered to only 380V (as indicated by the upper left arrow in FIG. 6), which is far lower than the peak voltage $V_{pk}$ of 540V in FIG. 3. Also, the test results in FIG. 6 clearly show that, at the instant when the series resonant converter is turned on from off, the peak current $I_{ppk}$ generated on the primary side is effectively reduced to only 15 A (as indicated by the arrow corresponding to the primary-side current $I_P$ in FIG. 6), which is lower than the primary-side peak current $I_{ppk}$ of 20 A in FIG. 3, and the peak current $I_{spk}$ generated on the secondary side is effectively reduced to only 200 A (as indicated by the arrow corresponding to the secondary-side current $I_s$ in FIG. 6, which is lower than the secondary-side peak current $I_{spk}$ of 280 A in FIG. 3.). Therefore, the present invention indeed enables the series resonant converter to use power switches with relatively low rated voltages and relatively low rated currents, thereby reducing the cost of the series resonant converter.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A series resonant converter capable of reducing peak voltage generated at power switches and peak current generated on secondary side when being turned on from off immediately, the series resonant converter comprising:

a transformer having a primary side provided with a primary winding and a secondary side provided with two secondary windings;

two primary-side power switches connected to the primary side and comprising a first power switch and a second power switch, wherein the first power switch and the second power switch are connected in series;

an input voltage filter capacitor connected across a DC input voltage and connected in parallel to the series-connected first and second power switches;

a resonant control chip having two control pins connected respectively to a gate of the first power switch and a gate of the second power switch;

a resonant capacitor having an anode connected to an end of the primary winding and a cathode connected to a source of the second power switch, wherein high voltage accumulated at the resonant capacitor is discharged to zero instantly while the series resonant converter is turned off;

a resonant inductor having an end connected to another end of the primary winding and another end connected to a line between the first power switch and the second power switch;

at least a bypass resistor connected in parallel to the resonant capacitor and connected to a ground end, wherein the bypass resistor is used to rapidly release the high voltage accumulated at the resonant capacitor to the ground end while the series resonant converter is turned off;

an output voltage filter capacitor having an end connected to a line between the two secondary windings; and two secondary rectifying elements each having an end connected to an end of each of the two secondary windings and another end connected to another end of the output voltage filter capacitor, so as for the output voltage filter capacitor to provide a DC output voltage.

2. The series resonant converter of claim 1, wherein the secondary rectifying element is a rectifier diode so as for the output voltage filter capacitor to provide the DC output voltage.

* * * * *